United States Patent [19]

Kawada et al.

[11] 4,275,342
[45] Jun. 23, 1981

[54] ABNORMALITY DETECTING SYSTEM FOR DC MOTOR CONTROL APPARATUS

[75] Inventors: Shigeki Kawada, Hino; Katsuo Kobari, Tachikawa; Hiroshi Ishida, Hamura, all of Japan

[73] Assignee: Fujitsu Fanuc Limited, Tokyo, Japan

[21] Appl. No.: 95,077

[22] Filed: Nov. 16, 1979

[51] Int. Cl.³ .............................. H02P 5/16
[52] U.S. Cl. .................. 318/490; 318/327; 318/463; 340/648
[58] Field of Search ............. 318/490, 565, 326-328, 318/463, 464, 465, 450, 449, 459, 461; 340/648, 621; 361/51, 23

[56] References Cited

U.S. PATENT DOCUMENTS

| | | | |
|---|---|---|---|
| 3,406,319 | 10/1968 | Faulkes | 318/565 |
| 3,576,485 | 4/1971 | Coons, Jr. | 318/327 |
| 3,778,696 | 12/1973 | Walters | 340/648 |
| 4,030,012 | 6/1977 | Buhler | 318/565 |
| 4,091,314 | 5/1978 | Johnson | 318/464 |
| 4,141,244 | 2/1979 | Dumbeck | 318/490 |

Primary Examiner—David Smith, Jr.
Attorney, Agent, or Firm—Staas & Halsey

[57] ABSTRACT

In a DC motor control apparatus for driving a DC motor in accordance with a signal of the difference between a revolving speed signal from a speed detector coupled with the DC motor and a command speed signal so as to drive the DC motor at a revolving speed indicated by the command speed signal, when a voltage to be applied to the DC motor and the revolving speed signal from the speed detector are both detected, the operation of the DC motor control apparatus is decided as normal, and when the voltage to the DC motor is detected but the revolving speed signal from the speed detector is not detected, the operation of the DC motor control apparatus is decided as abnormal and an alarm signal is produced.

4 Claims, 2 Drawing Figures

ABNORMALITY DETECTING SYSTEM FOR DC MOTOR CONTROL APPARATUS

BACKGROUND OF THE INVENTION

1. Field of the Invention

This invention relates to an abnormality detecting system for a DC motor control apparatus which drives a DC motor at a revolving speed following a command speed signal.

2. Description of the Prior Art

In a DC motor control apparatus of the type in which a tachogenerator or a like speed detector is coupled with a DC motor to perform drive control of the DC motor in accordance with a signal corresponding to the difference between a DC motor revolving speed signal from the speed detector and a command speed signal to drive the DC motor at a revolving speed represented by the command speed signal, if no revolving speed signal is provided due to a trouble of the speed detector, the abovesaid difference signal is not obtained, so that the revolving speed of the DC motor rises abnormally high to put the DC motor in a runaway state, possibly developing trouble in a load driven by the DC motor.

SUMMARY OF THE INVENTION

An object of this invention is to detect an abnormality of a speed detector coupled with a DC motor to prevent it from runaway operation.

Briefly stated, in the present invention, when a voltage to be applied to the DC motor and a revolving speed signal from the speed detector coupled with the DC motor are both detected, the DC motor is decided as normal, and when the voltage to the DC motor is detected but the revolving speed is not detected, the DC motor is decided as abnormal and an alarm signal is produced.

DETAILED DESCRIPTION OF THE PREFERRED EMBODIMENTS

Figure 1:
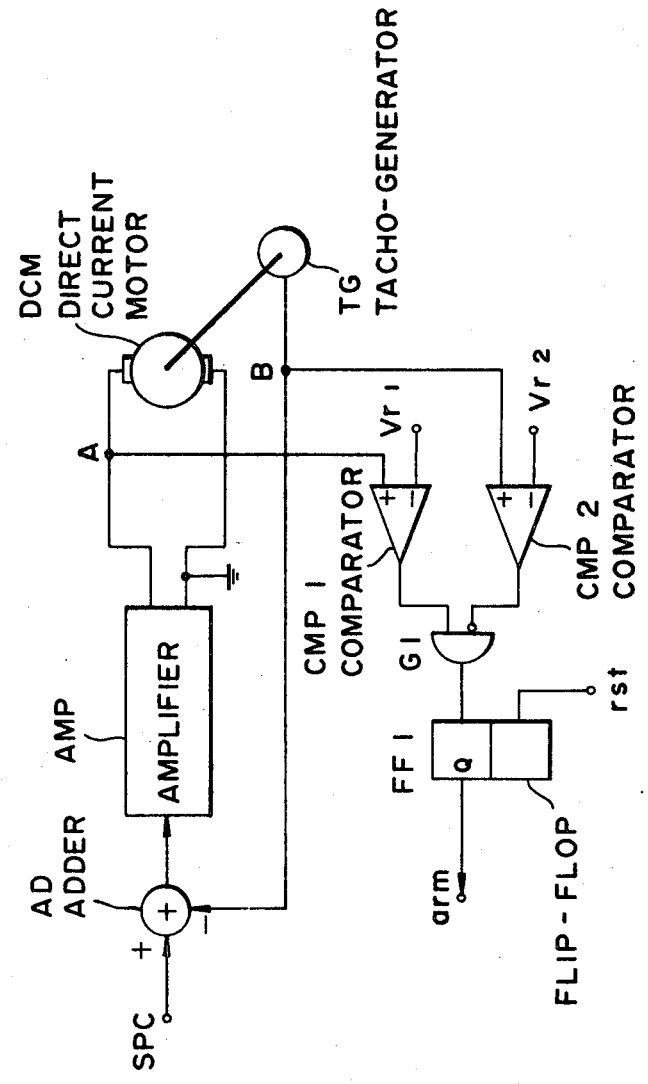
FIG. 1 is a block diagram illustrating an embodiment of this invention.

In the embodiment shown in FIG. 1, such an arrangement is already known in the art in which a tachogenerator TG is coupled with a DC motor DCM, a speed command signal SPC and a revolving speed signal from the tachogenerator TG are applied to an adder AD to obtain a signal of the difference between the two signals and the output from the adder AD is amplified by an amplifier AMP and applied to the DC motor DCM to drive it at a revolving speed following the speed command signal SPC. The present invention is intended to detect an abnormality of the tachogenerator TG through utilization of the voltage to the DC motor DCM and the revolving speed signal from the tachogenerator TG serving as the speed detector. To perform this, the voltage A to be applied to the DC motor DCM is compared with a constant reference voltage Vr1 in a comparator CMP1 and a revolving speed signal B is compared with a constant reference voltage Vr2 in a comparator CMP2. When $A > Vr1$ and $B > Vr2$, the outputs from the comparators CMP1 and CMP2 are both "1". Accordingly, the output from a gate circuit G1 is "0", so that a flip-flop FF1 is retained in its initial state in which it is reset by a reset signal rst, and an alarm signal arm at a Q output terminal is "0", indicating the normal state.

When trouble develops in the tachogenerator TG and the revolving speed signal B is not derived therefrom, $A > Vr1$ and $B > Vr2$, causing the comparators CMP1 and CMP2 to provide outputs "1" and "0", respectively. As a consequence, the output from the gate circuit G1 becomes "1" to set the flip-flop FF1 and to make the alarm signal arm at the Q output terminal become "1", thus enabling abnormality detection. It is desirable to select the voltages Vr1 and Vr2 so that, in the normal state, the output from the comparator CMP1 becomes "1" at least after the output from the comparator CMP2 becomes "1".

The above embodiment has been described in connection with the case where the DC motor DCM rotates in one direction, but in the case of the DC motor rotating in both forward and reverse directions, there are provided abnormality detecting arrangements for the forward rotation and for the reverse rotation, respectively.

Figure 2:
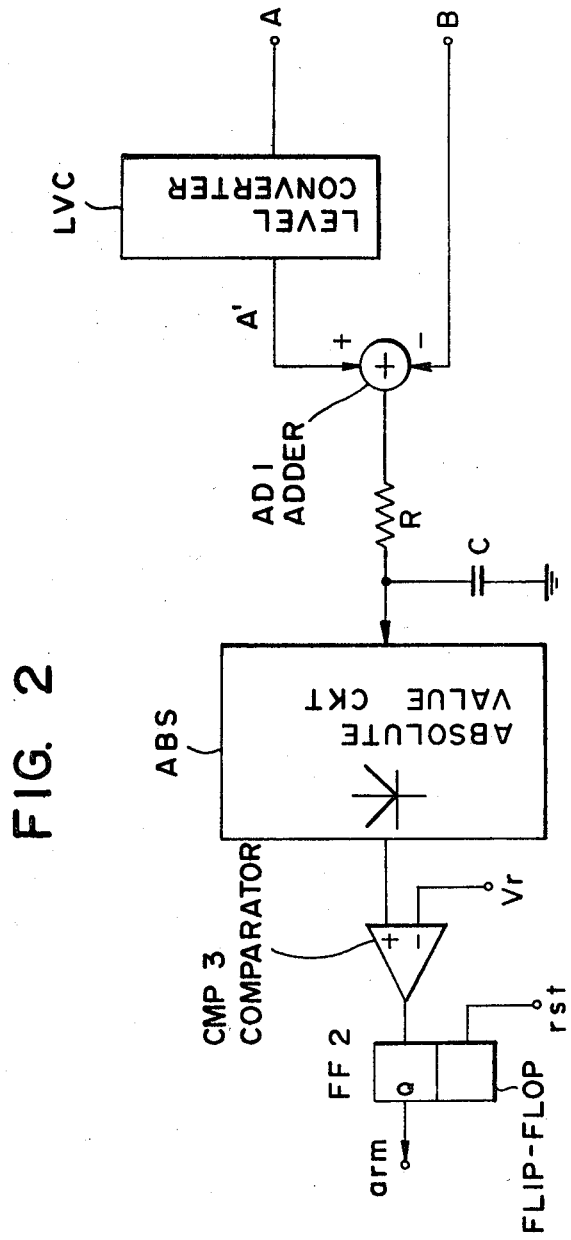
FIG. 2 is a block diagram showing the principal part of another embodiment of this invention.

FIG. 2 shows in block form the principal part of another embodiment of this invention, in which a level converter LVC is provided for making the level of the voltage A to the DC motor equal to the level of the revolving speed signal B from the tachogenerator and in which, after level conversion of the voltage A, the converter output A' is provided to an adder AD1 for an addition of $A' + (-B)$ and then the adder output is applied to an absolute value circuit ABS via a filter composed of a resistor R and a capacitor C. Since the output from the adder AD1 becomes positive or negative in dependence on the rotational direction of the DC motor, this output is made by the absolute value circuit ABS to be a signal of one polarity. The output from the absolute value circuit ABS and a constant reference voltage Vr are compared by a comparator CMP3, and when the difference between the output A' from the level converter LVC and the revolving speed signal B is large, that is, when the revolving speed signal B is not available due to a trouble in the tachogenerator, the output from the comparator CMP3 becomes "1" to set a flip-flop FF2, causing the alarm signal arm to be "1".

This embodiment employs only one comparator although the DC motor rotates in both forward and reverse directions. Further, in the case where the tachogenerator generates an AC voltage or pulses of a frequency proportional to the number of revolutions of the DC motor instead of the DC voltage proportional to its number of revolutions, the revolving speed signal B can be obtained by converting the AC voltage or the pulses into a voltage using a converter.

As has been described in the foregoing, according to this invention, in DC motor control apparatus of the type coupling a speed detector with a DC motor, the operation of the tachogenerator is decided as normal when a voltage for driving the DC motor and a revolving speed signal from the speed detector are both detected, and upon occurrence of an abnormality such as, for example, disconnection of the tachogenerator, no revolving speed signal is provided therefrom, so that an alarm signal is produced to indicate the occurrence of abnormality and is utilized to achieve control preventing runaway of the DC motor. Such control can be effected automatically or manually.

It will be apparent that many modifications and variations may be effected without departing from the scope of the novel concepts of this invention.

What is claimed is:

1. An abnormality detecting system for a DC motor control apparatus in which a DC motor is driven in accordance with a signal corresponding to the difference between a revolving speed signal from a speed detector coupled with the DC motor and a command speed signal for driving the DC motor at a revolving speed indicated by the command speed signal, said system comprising determining means for determining the normality of the operation of the DC motor control apparatus to be normal comprising a first comparator for comparing the voltage to the DC motor with a first reference voltage and a second comparator for comparing the revolving speed signal from the speed detector with a second reference voltage, said determining means for determining said operation of the DC motor control apparatus comprising means for determining said operation to be normal when the logic outputs from the first and second comparators are equal to each other, and means for determining said operation of the DC motor control apparatus to be abnormal when the logic outputs from the first and second comparators are different from each other.

2. The system of claim 1 comprising means for generating an alarm signal when said operation of the DC motor control apparatus is determined to be abnormal.

3. The system of claim 2, said determining means operating for rotation of said motor only in one direction, said determining means comprising a logic gate for receiving the outputs of said first and second comparators, said logic gate having an output corresponding to said determined state of said operation of said motor control apparatus, the output of said first comparator having a first logic state when said voltage to said DC motor is larger than said first reference voltage, and the output of said second comparator having the same first logic state when said revolving speed signal is larger than said second reference voltage, and the output of each said first and second comparators having the opposite binary logic state when each respective condition fails to occur.

4. The system of claim 3, said logic gate having said first logic output when said first comparator has said first logic state and said second comparator has said opposite logic state, and said system comprising a resetable flip-flop for receiving the output of said logic gate for providing said alarm signal.

* * * * *

UNITED STATES PATENT AND TRADEMARK OFFICE
CERTIFICATE OF CORRECTION

PATENT NO. : 4,275,342

DATED : 23 June 1981

INVENTOR(S) : SHIGEKI KAWADA et al.

It is certified that error appears in the above—identified patent and that said Letters Patent is hereby corrected as shown below:

```
Front page, [56] References cited, "Walters" should be
      -- Walters et al. --.
Col. 4, line 18, delete "each";
                 delete "the";
        line 19, "state" should be --states--;
        line 24, "rese-" should be --reset---.
```

Signed and Sealed this

Eighth Day of December 1981

[SEAL]

Attest:

GERALD J. MOSSINGHOFF

Attesting Officer

Commissioner of Patents and Trademarks